United States Patent
Duparcmeur et al.

(10) Patent No.: US 6,633,869 B1
(45) Date of Patent: Oct. 14, 2003

(54) MANAGING OBJECT RELATIONSHIPS USING AN OBJECT REPOSITORY

(75) Inventors: Yann Limon Duparcmeur, Paris (FR); Robert N. Patience, Huntsville, AL (US); Jean Louis Ardoin, Clamart (FR)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/561,491

(22) Filed: Apr. 28, 2000

Related U.S. Application Data

(63) Continuation-in-part of application No. 09/459,812, filed on Dec. 13, 1999, now Pat. No. 6,292,804, which is a continuation of application No. 08/937,147, filed on Sep. 24, 1997, now Pat. No. 6,052,691, which is a continuation of application No. 08/437,942, filed on May 9, 1995, now Pat. No. 5,692,184.
(60) Provisional application No. 60/131,970, filed on Apr. 30, 1999.

(51) Int. Cl.[7] ............................................. G06F 17/30
(52) U.S. Cl. ........................ 707/6; 707/102; 707/103 R; 707/104.1
(58) Field of Search .............................. 707/1–10, 100, 707/102, 103 R, 104.1

(56) References Cited

U.S. PATENT DOCUMENTS

| | | | | |
|---|---|---|---|---|
| 5,692,184 A | * | 11/1997 | Ardoin et al. | 707/103 R |
| 5,724,575 A | * | 3/1998 | Hoover et al. | 707/10 |
| 5,752,249 A | * | 5/1998 | Macon, Jr. et al. | 707/103 R |
| 5,787,437 A | | 7/1998 | Potterveld et al. | |
| 5,819,281 A | | 10/1998 | Cummins | |
| 5,842,220 A | | 11/1998 | De Groot et al. | |
| 5,905,987 A | * | 5/1999 | Shutt et al. | 707/103 R |
| 5,937,402 A | * | 8/1999 | Pandit | 707/4 |
| 6,003,039 A | * | 12/1999 | Barry et al. | 707/103 R |
| 6,035,342 A | * | 3/2000 | Bernstein et al. | 709/303 |
| 6,052,691 A | * | 4/2000 | Ardoin et al. | 707/102 |
| 6,169,993 B1 | * | 1/2001 | Shutt et al. | 707/103 R |
| 6,198,487 B1 | * | 3/2001 | Fortenbery et al. | 345/420 |
| 6,292,804 B1 | * | 9/2001 | Ardoin et al. | 707/102 |
| 6,327,593 B1 | * | 12/2001 | Goiffon | 707/102 |
| 6,427,230 B1 | * | 7/2002 | Goiffon et al. | 717/108 |

FOREIGN PATENT DOCUMENTS

EP 0742523 11/1996

OTHER PUBLICATIONS

"Shoring Up Persistent Applications"—Michael Carey, David DeWitt, Michael Franklin, Nancy Hall—Computer Sciences Department of University of Wisconsin—Madison; SIGOD 94—5/94; 1994 ACM (pp: 383–394).*

"Object and Relational databases"—Jen–Yao Chung, Yi–Jing Lin and Daniel T. Chang—IBM—Austin, TX 1995 ACM 1Oct. 19, 1995; (pp: 164–169).*

"Mostly–Copying Reachability–Based Orthogonal persistence"—Antony L. Hosking & Jiawan Chen; OOPSLA'99 11/99 1999 ACM (pp: 382–398).*

Philip A. Bernstein et al., "Microsoft Repository Version 2 and the Open Information Model", Microsoft Corporation, Redmond, WA 98052.

(List continued on next page.)

Primary Examiner—Shahid Al Alam
Assistant Examiner—Anh Ly
(74) Attorney, Agent, or Firm—Townsend and Townsend and Crew LLP

(57) ABSTRACT

A method for maintaining consistency between objects in a computer system by defining relationship patterns. A relationship pattern is a collection of entities having relationships with a common entity called an active entity. A semantic entity is associated with the active entity describing the actions to be performed for updating one or more entities of the relationship pattern in response to modification, copying, or deletion of one or more entities participating in the relationship pattern.

17 Claims, 12 Drawing Sheets

OTHER PUBLICATIONS

Microsoft Corporation, "What Is Microsoft Repository?" Dec., 1996.

Valor Whisler, "The Microsoft Repository: An Overview", Mar. 17, 1997.

Philip A. Bernstein et al., "The Microsoft Repository", Proceedings of the 23rd VLDB (Very Large Data Bases) Conference, Athens, Greece, 1997.

Philip A. Bernstein et al., "The Microsoft Repository", Proceedings of the 23rd VLDB Conference, Athens, Greece 1997.

Compass Team, "Multiple Repository Compass core Subsystem", Nov. 10, 1998.

Microsoft, "Microsoft's Goal in Developing a Repository", Product Information, Dec. 7, 1998.

Microsoft, "Microsoft Repository Engine", Product Information, Dec. 7, 1998.

Microsoft, "History of Microsoft Repository", Product Information, Dec. 7, 1998.

Microsoft, "Microsoft Repository's Endorsement of Standards", Product Information, Dec. 7, 1998.

Microsoft, "Integrated Meta Data Management", Product Information, Dec. 7, 1998.

Microsoft, "XML Interchange Format (XIF)", Product Information, Dec. 7, 1998.

Microsoft, "The Open Information Model", Product Information, Dec. 7, 1998.

Microsoft, "What is Microsoft Repository?", Product Information, Dec. 7, 1998.

Microsoft, "Why You Need Microsoft Repository", Product Information, Dec. 7, 1998.

Microsoft, "Microsoft Repository Technical Overview", Technical Materials, 1998.

J. Rumbaugh, "Controlling Propagation of Operations Using Attributes on Relations", Proceedings of the Object Oriented Programming Systems Languages and Applications Conference (OOPSLA), San Diego, CA, US, Special Issue of SIGPLAN Notices, vol. 23, No. 11, Sep. 25, 1998—Sep. 30, 1988, pp. 285–296.

J.C. Grundy et al., "Supporting Flexible Consistency Management via Discrete Change Description Propagation", Software Practice & Experience, John Wiley & Sons Ltd., vol. 26, No. 9, Sep. 1, 1996, pp. 1053–1083.

S.R. Gorti et al., "An Object–Oriented Representation for Product and Design Processes", Computer Aided Design, Elsevier Publishers, vol. 30, No. 7, Jun. 1, 1998, pp. 489–501.

* cited by examiner

MANAGING OBJECT RELATIONSHIPS USING AN OBJECT REPOSITORY

CROSS-REFERENCES TO RELATED APPLICATIONS

This application claims priority from the following provisional patent application, the disclosure of which is herein incorporated by reference for all purposes:

U.S. Provisional Patent Application No. 60/131,970 in the names of Yann L. Duparcmeur, et al. titled, "Object Relationship Management System," filed Apr. 30, 1999.

This application is a continuation-in-part of U.S. patent application Ser. No. 09/459,812, filed Dec. 13, 1999 (now U.S. Pat. No. 6,292,804), which is a continuation of U.S. patent application Ser. No. 08/937,147, filed Sep. 24, 1997 (now U.S. Pat. No. 6,052,691), which is a continuation of U.S. patent application Ser. No. 08/437,942, filed May 9, 1995 (now U.S. Pat. No. 5,692,184).

The following commonly owned previously filed applications are hereby incorporated by reference in their entirety for all purposes:

U.S. patent application Ser. No. 09/258/595 in the names of Mark D. Fortenbery, et al. titled, "OLE for Design and Modeling," filed Feb. 26, 1999; and U.S. patent application Ser. No. 09/459,812 in the names of Jean-Louis Ardoin et al. titled, "Object Relationship Management System", filed Dec. 13, 1999.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of object based software systems, and more particularly to techniques for managing relationships between objects of the software systems and maintaining data and referential integrity of the software systems when an object is changed, for example, modified, copied, or deleted.

With the increase in the number of heterogeneous application programs used by consumers, it become increasingly important that these applications be able to communicate with each other in a consistent manner without having to know the. implementation details of the applications involved. Traditionally, this was accomplished by using applications developed by a common vendor or by a group of vendors who had agreed upon a common interface between the various applications. While this approach achieved a limited degree of success in integrating heterogeneous applications, the approach soon became unfeasible as the number of vendors and the number of applications rapidly increased.

More recently vendors are attempting to solve the application integration problem by developing applications using object-oriented frameworks and repository technology. Repositories enable sharing and reuse of information by providing a common hub for storing metadata which describes the structure and meaning of software components. Metadata enables heterogeneous applications to manipulate software components without knowing the implementations of the components. To promote sharing and reuse of metadata information among heterogeneous applications, information models are defined to standardize the structure and semantics of the metadata. A repository, using a standardized information model, provides a global and consistent mechanism for accessing metadata for application development.

An example of a repository is the Microsoft Repository developed by Microsoft Corporation of Redmond, Wash. The Microsoft Repository uses the Open Information Model (OIM) for describing metadata specifications and provides an environment for sharing, reuse, and integration of metadata for application development. Information stored in the Microsoft Repository is exposed using Microsoft's Common Object Model (COM) which forms the basis for the Object Linking and Embedding (OLE) technology which allows objects to share data and capabilities. COM defines a binary standard for object implementation that is independent of the implementation programming language. COM objects are in-memory representations of the information stored in the repository. A repository may include a object-oriented or relational or mixed database.

The repository information model defines the classes of the objects, types of relationships that can exist between the objects, and various properties that are attached to the object classes and the relationship types. A "class" may contain properties, methods, and collections which are grouped into functionally related groups which are implemented as COM "interfaces." In COM, a class may have multiple interfaces which are publicly accessible to users of the object-oriented framework and enable communication between applications.

A repository object is defined in terms of the interfaces that it exposes. The set of interfaces that an object exposes describes the object's state, the manner in which the object can be manipulated, and the associations the object can have with other objects. Relationships may also be defined between interfaces of different objects or of the same object. Further information and details about COM and OLE may be obtained from "Inside OLE 2" by Kraig Brockschmidt, 1994, Microsoft Press, and "Inside COM, Microsoft's Component Object Model," by Dale Rogerson, 1997, Microsoft press, both of which are hereby incorporated by reference for all purposes.

FIG. 1 depicts a convention representation of a COM interface 10, for an object 11 (another term for object 11 is component) and a user 12 of the object. Object 11 is said to have an "interface implementation", including interfaces 13 and 14, that are analogous to an object oriented programming "class." Interfaces 13 and 14 include member functions 15 and 16, respectively. User 12 can manipulate object 11 by calling functions 15, and 16 of interfaces 13 and/or interface 14, respectively. In response to the function calls, object 11 may return specific data about itself to user 12. Object 11, however maintains exclusive control of its own data 17. In some cases user 12 may only be aware of one of several interfaces available in object 12. The available interface may then be queried for additional interfaces. A pointer to the queried interface is returned if the queried interface is supported by the object. For example, the IUnknown interface 13 is a COM interface that is typically available to all users of COM objects. The IUnknown interface may then be queried to obtain pointers to other interfaces supported by the object, such as interface 14. After obtaining a pointer to interface 14, user 12 can call member functions 16 belonging to interface 14.

As previously stated, relationships may be established between interfaces of one or more objects or between interfaces of the same object. A relationship describes the way in which one object refers to another object, as exposed through their interfaces. The participants in a relationship are usually referred to as "entities" participating in the relationship. Relationships are usually binary, for example relationships in Microsoft Repository, may be directed or bidirectional. A relationship typically includes an origin of the relationship, referred to as the "origin" entity, and a destination of the relationship, referred to as the "destination" entity. In Microsoft Repository, each relationship conforms to a particular relationship type and is associated with an object of the class RelationshipDef. This object contains the metadata associated with the relationship.

Several actions have to be preformed when entities involved in a relationship are changed, for example, modified, copied, or deleted. These operations are important for maintaining referential and data integrity of the object system. Accordingly, an important aspect of any object-oriented framework system is the manner in which referential and data integrity of the system is maintained when entities involved in a relationship are changed.

Several techniques have been developed for maintaining integrity of the object system when entities participating in relationships are changed. In conventional systems, the actions be performed upon a change operation are usually associated with each occurrence of the relationship. In addition, the code implementing the actions is typically spread through out the object implementation and thus is difficult to understand and maintain. The increased complexity of the implementation also makes it unsuitable for modification or customization.

Thus, there is a need for a relationship management system which allows generalized relationships to be defined between objects and which provides a simplified technique for maintaining referential and data integrity of the object system when objects involved in a relationship are changed.

SUMMARY OF THE INVENTION

One embodiment of the present invention provides a method of maintaining consistency between objects in a computer system. The method includes providing a first relationship between a first entity and a second entity. A semantic is also provided, including an action to be performed in response to a change in the first entity. A semantic object is associated with the second entity and making a change in the first entity invokes the action. In a second embodiment, the method may also include providing a second relationship between a third entity and the second entity. And after the action is invoked, performing the action on the third entity. The action may be selected from a group consisting of copy, delete, and modify.

In another embodiment a computer system for maintaining consistency between objects is provided. The computer system includes a processor; and a memory coupled to the processor. The memory stores relationship pattern information and modules for execution by the processor. The pattern information includes information defining a first relationship between a first entity and a second entity, information defining a second relationship between a third entity and the second entity, and information defining a semantic object with actions to be performed for changing the third entity in response to changes in the first entity. The modules include a module for associating the semantic object with the second entity and a module for invoking the actions when the first entity is changed.

In yet another embodiment a method of assembling information in order to maintain integrity of objects in a database is provided. The method includes establishing a relationship pattern, having a binary relation between a first entity and a second entity. A semantic object having an action to be performed in response to a change in the first entity is provided and is associated with the second entity. Metadata having information from the relationship pattern and arguments of the semantic object are then determined. The metadata and the semantic object are stored. In one embodiment the metadata is stored in a COM or CORBA repository and the semantic object is stored in a DLL file.

In another embodiment a method for updating information in a database, having a first relation between a first entity and a second entity and a second relation between a second entity and a third entity is provided. A first object of the first entity is next changed. The first relation associated with the first object is identified and using the first relation and repository metadata, the second entity is identified. The second entity is also identified as an active entity. A semantic object associated with the active entity is next found, where the semantic object has an action to be performed in response to a change in the first entity. Using arguments of the semantic object, the third entity is identified. Lastly, the action is evaluated to change the third entity.

In another embodiment a method for providing consistency among persistent objects in a computer system is disclosed. The technique includes using the metadata in a repository to construct a graph having entities and relations; A semantic object is associated with each active entity. A passive entity having a persistent object is then changed in the graph; and the graph is traversed to update the entities using the semantic objects.

DESCRIPTION OF THE SPECIFIC EMBODIMENTS

Figure 1:
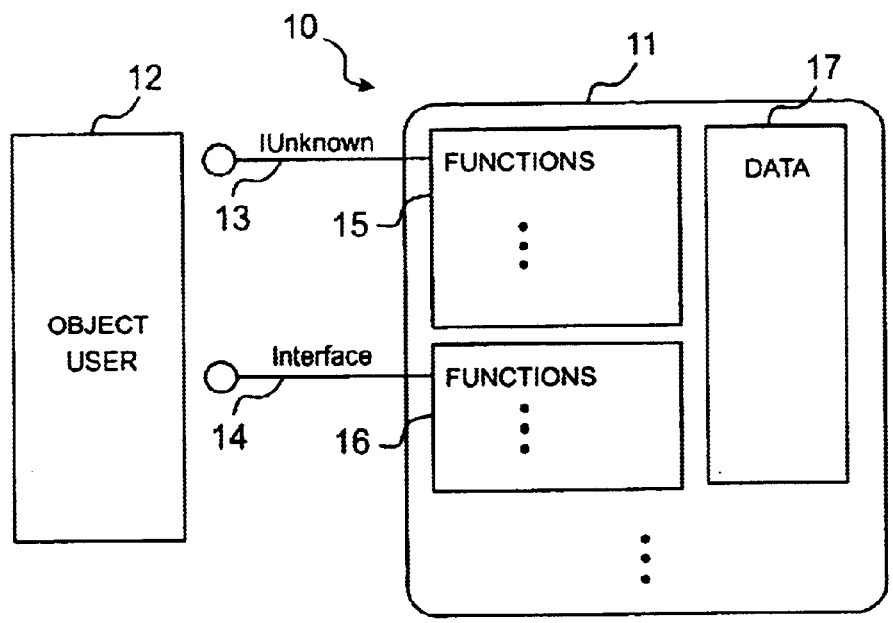
FIG. 1 depicts a convention for representing COM/OLE interface for an object and a consumer of the object according to an embodiment of the present invention.
Figure 2:
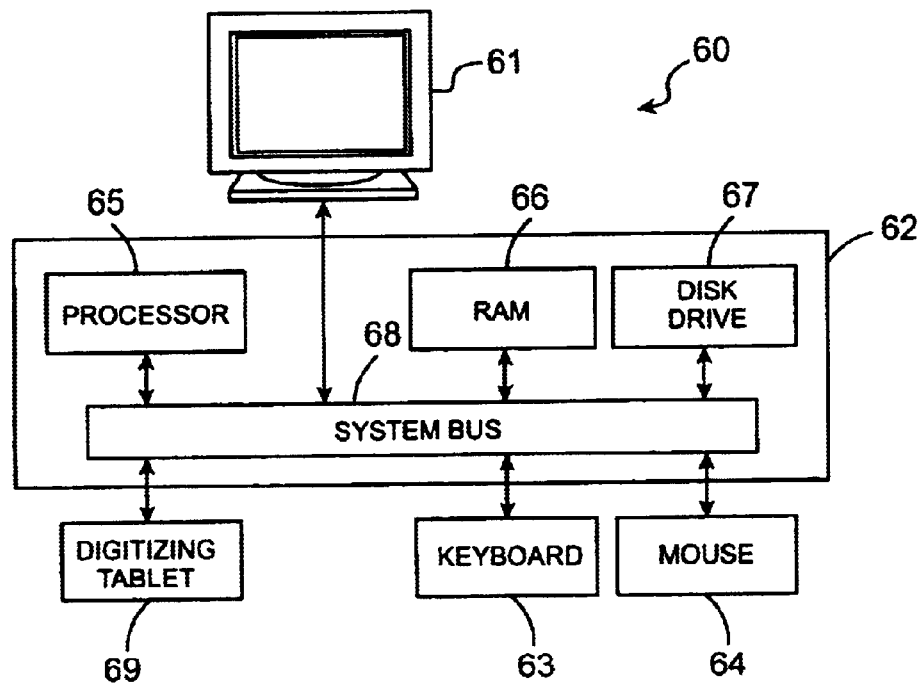
FIG. 2 depicts a block diagram of a system incorporating an embodiment of the present invention.

FIG. 2 is a block diagram of a system 60 incorporating an embodiment of the present invention. System 60 includes a display monitor 61, a computer 62, a keyboard 63, and a mouse 64. Computer 62 includes familiar computer components such as a processor 65, and memory storage devices such as a random access memory (RAM) 66, a disk drive 67, and a system bus 68 interconnecting the above components. Mouse 64 is but one example of a graphical input device, a digitizing tablet 65 is an example of another. In the embodiment depicted in FIG. 2, system 60 includes a IBM PC compatible personal computer, running Windows operating system or one of its variants, OLE and COM software developed by Microsoft Corporation, and ASSOC GSCAD product currently under development by Intergraph Corporation. FIG. 2 is representative of one type of system for embodying the present invention. It will be readily apparent to one of ordinary skill in the art that many system types and configurations are suitable for use in conjunction with the present invention.

According to one specific embodiment of the present invention a relationship pattern includes a set of entities related to one common entity by binary relationships and a semantic object. The types of binary relationships include dependency and equivalence. A further description is given in U.S. Pat. No. 5,692,184, "Object Relationship Management System," by Jean-Louis Ardoin, et. al, filed May 9, 1995, assigned to Intergraph Corporation, which is herein incorporated by reference in its entirety for all purposes (referred to herein as "U.S. Pat. No. 5,692,184"). For sake of documentation, the common entity in a relationship pattern definition is referred to as an "active" entity. The active entity is, for example, an interface definition or an instance of the Microsoft Repository class InterfaceDef. In this embodiment relationship definitions between entities are stored in the Microsoft Repository and relationship pattern definitions are defined based on the relationship definitions stored in the Microsoft repository, which includes a database.

The set of entities related to the active entity by binary relationships are referred to as "passive" entities. These passive entities are connected to the active entity by membership in one or more binary relationships. A relationship describes the functional way in which the passive entities contribute to or respond to changes in the active entity. Accordingly, a passive entity may serve either as an input entity or as an output entity or as a constraint for a relationship pattern. A cardinality value is associated with each end of a relationship describing the expected number of participants or elements on either side of a relationship. The cardinality may comprise zero or more elements. When a relationship has a directionality, i.e., a dependency relationship, then one end of the relationship is called the "origin" while the other end of the relationship is called a "destination." The cardinality and/or end designation, i.e., origin or destination, of each end of a binary relationship is called a "role." It should be noted that the words "active" and "passive" are used only for documentation purposes and do not in any manner limit the scope of the present invention.

The semantic object describes actions to be performed to maintain referential and data integrity of the object system or database when any entity of a relationship pattern is changed, for example, modified, copied, or deleted. The actions include a delete action describing processing to be triggered when a relationship pattern entity is deleted, a copy action describing processing to be triggered when a relationship pattern entity is copied, and one or more modify (or "compute") actions describing processing to be triggered when a relationship pattern entity is modified or a computation on an object(s) is performed. A semantic object is a functional unit and does not store any state information about the relationship pattern from one invocation to the next. In one embodiment a semantic object is realized as a COM interface, for example, IJCompute, for the compute/modify semantic object.

The semantic object has one or more arguments related to the semantic object by repository relationships. The arguments include the relationship type. Typically, the arguments are part of information that provides a navigation path from the active entity to the passive entity/entities. An argument may be classified as input, output, or constraint, where constraint occurs in an equivalence relationship.

A semantic object may be associated with any interface in the object system. The interface with which the semantic is associated becomes the active entity. This facilitates the extensibility of the object system. Further, in one embodiment of the present invention, the arguments of a semantic object and their type in the relationship pattern, i.e. input, output, or constraint, are readily definable. This improves ease of use of the object system.

In sum, in one embodiment, a relationship pattern includes an active entity, one or more passive entities, the binary relationships with accompanying roles, and a semantic object.

Figure 3:
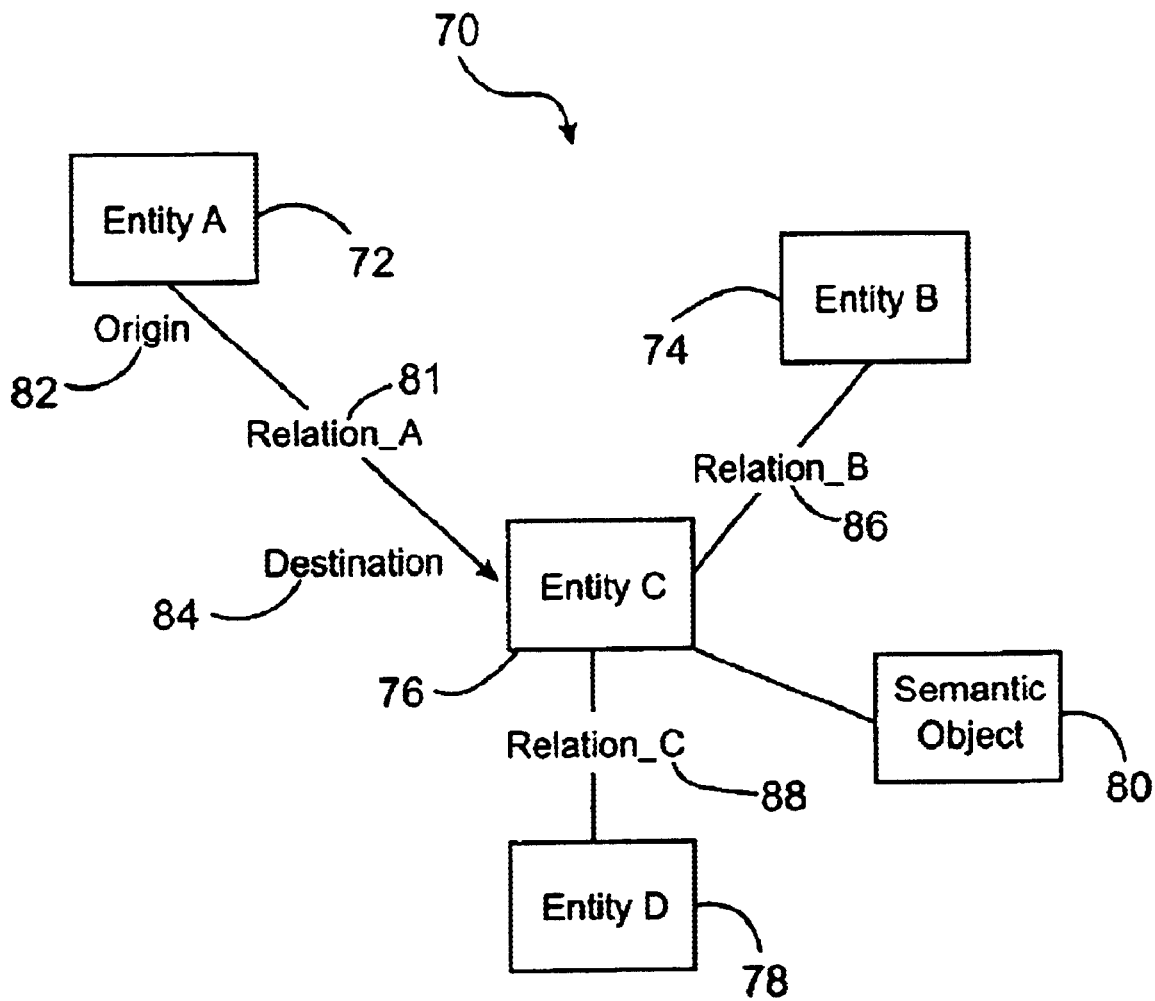
FIG. 3 depicts the various components of a relationship pattern according to an embodiment of the present invention.

FIG. 3 depicts an example of a relationship pattern 70 entities A 72, B 74, C 76, D 78 and semantic object 80. Entity C 76 is the active entity since it is the common entity which is involved in a binary relationship with the other entities in the relationship pattern. Entities A 72, B 74, and D 78 are passive entities. FIG. 3 also shows three binary relationships: Relation_A 81, Relation_B 86, and Relation_C 88. Relation_A 81 shows a dependency relationship with a Origin 82 and a Destination 84, where Origin 84 and Destination 86 are two roles of Relation_A. A semantic object 80 is associated with active entity C 76 and controls the processing to be triggered, in the context of an active entity, when an entity belonging to the relationship pattern is change, for example, modified, copied, or deleted.

Figure 4:
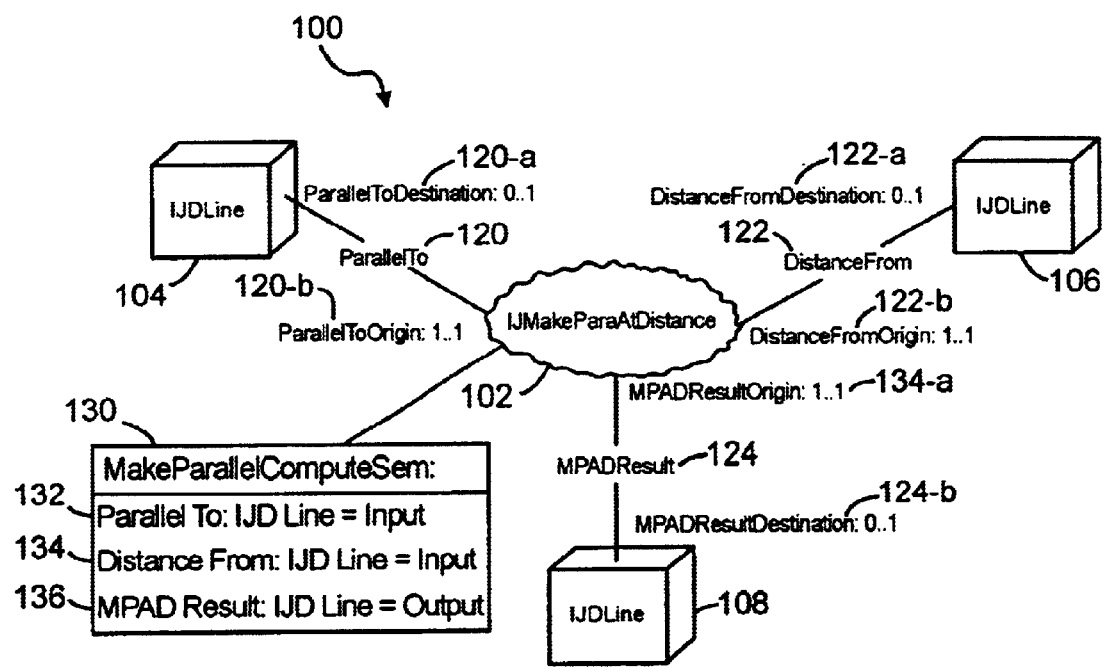
FIG. 4 depicts an example of a relationship pattern according to an embodiment of the present invention.

FIG. 4 depicts an example of a relationship pattern 100 including active entity IJMakeParaAtDistance 102 and three passive entities 104, 106, and 108 defined as IJDLine interfaces. Entities 104 and 106 are the input entities while entity 108 is the output entity for relationship pattern 100. According to the relationship pattern of FIG. 4, output entity 108 is drawn parallel to input entity 104 and at a predetermined distance from input entity 106. Passive entity 104 is in a relationship "ParallelTo" 120 with active entity 102, passive entity 106 is in a relationship "DistanceFrom" 122 with active entity 102, and output passive entity 108 is in a relationship "MakeParallelAtDistanceResult (MPADResult)" 124 with active entity 102. Further, all three relationship have a 1-1 cardinality on the origin of the active entity relationship. This implies that one IJDLine entity 108 established via relationship MPADResult 124 is parallel to one IJDLine entity 104 established via relationship ParallelTo 120 and a specific distance from one IJDLine entity 106 established via relationship Distancefrom 122. The cardinalities on the destination sides of the relationship are 0-1 implying that the IJDLine entities do not have to be in the relationship, but if they are, then at most one JDLine can be in the relationship. There are several roles, for example, 120-*a*, 120-*b*, 122-*a*, 122-*b*, 124-*a*, and 124-*b*. An illustrative example is the roles for the "ParallelTo" 120 relationship, which are "ParallelToDestination: 0..1" 120-*a* on the destination side and "ParallelToOrigin: 0.. 1" 120-*b* on the origin side.

A semantic object 130 is associated with active entity 102. Semantic object 130 shown in FIG. 4 has an accompanying evaluate method, which recomputes the output entity when changes are made to the input entities 104 or 106. In one embodiment the semantic object 130 is implemented as a COM object. An example of a class definition, i.e., COM object, for the MakeParallelComputeSem semantic object 130 is:

```
        Class CMakeParallelComputeSem: IJCompute
{
    public:
        STDMETHODIMP Evaluate( LPENUMJARGDESC
pRelatedValues );
        STDMETHODIMP PreValueModify( LPJARGDESC
pPreModifyValue, LPENUMJARGDESC pArgsOfSemantic );
}
        IJCompute is the base class for CMakeParallelComputeSem
and is the interface for Class CMakeParallelComputeSem
In one embodiment IJCompute may have the following format:
        Interface IJCompute: IUnknown
        {
        IJCompute::EnumValues
            Enumerates the arguments of the semantic and qualifies them
            as input / output / constraint. A return code of
            RELATION_S_IMPLICIT_INPUT / OUTPUT
            indicates that entities enumerating the corresponding relation
            should be considered as argument of the semantic even if not
            enumerated by this function
        IJCompute::Evaluate
            Asks the semantic(s) to update its output after a change of
            one or more of its inputs. This function is called only if
            arguments of the semantics have been actually been modified.
        IJCompute::GetSolver
            Only used on constraint to find the corresponding constraint
            solver.
        IJCompute::PreValueModify
            Tells the semantic(s) that the passed in argument is about to be
            modified. This occurs before the modification actually
            happens. The modification could come from a command, a
            recompute semantic or a solver.
        IJCompute::ImplementDeferOrError
            Indicates if the semantic is defer / error aware.
        }
        The code implementing the Evaluate method may be,
for example, the following (stub format):
        STDMETHODIMP CMakeParallelComputeSem::Evaluate
        (LPENUMJIDREF pRelatedValues)
        {       // Code to recompute the output entity 108 when
                changes are made
                // to the input entities 104 or 106
                return S_OK;
        }
```

The MakeParallelComputeSem semantic object 130 takes two input arguments, Parellelto:IDJLine=INPUT 132, and DistanceFromOrgin:IDJLine=INPUT 134 and one output argument, MPADResult:IDJLine=OUTPUT 136. In alternate embodiments, a delete and copy semantic may also be associated with active entity 102. For the example of FIG. 4, active entity 102 exists solely for providing a context around which to build the relationship pattern. The active entity is thus an interface to a "stub" object. However, in alternate embodiments a "real" object or a business object may also act as an active entity.

Figure 5:
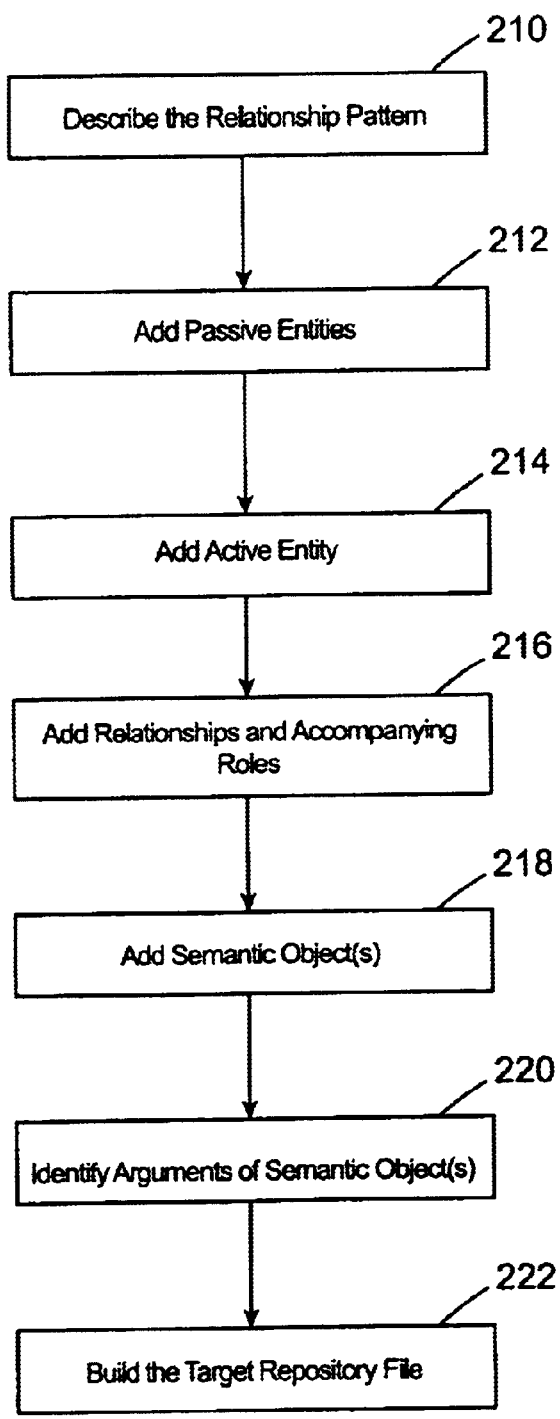
FIG. 5 shows a block diagram illustrating the steps to create metadata for a relationship pattern in a specific embodiment of the present invention.

FIG. 5 shows a block diagram illustrating the steps to create metadata for a relationship pattern in a specific embodiment of the present invention. First the relationship pattern is described (step 210) either using an informal figure such as FIG. 4 or using a Universal Modeling Language (UML) diagram. Next the passive entities must be created or located using a GUID (Globally Unique Identifier) or a IID (Interface Identifier)—OBJID (Object Identifier) pair (step 212). The active entity is then created or located (step 214) using another GUID or IID-OBJID pair. In step 216 the relationships between the active entity and one or more passive entities are added. These binary relationships may have a cardinality and/or a direction. The relationships may have roles, for example, a dependency relationship has an "Origin" role and a "Destination" role. The semantic object(s) is declared (step 218) and any arguments that the semantic needs to function are identified (step 220). The preceding steps created metadata that at step 222 can be stored in the Repository.

FIG. 4 may be used as an example of using the steps of FIG. 5 for creating metadata for the Repository, in a specific embodiment. The code is in Appendix 1, which is incorporated herein. The ASSOC update engine is given in Appendix 2, which is incorporated herein. FIG. 4 describes the relationship pattern (step 210).

At step 212 OBJIDs and IIDs for passive entities are declared. A relationship pattern uses objects via their interfaces. Thus the object-interface pairs for all passive contributors to each relationship in the pattern need to be specified. In our example, we have the same JDLine accessed via its IJDLine interface for each of the three relationships 120, 122, and 124. Thus we define an OBJID (which is a GUID appended by a long identifier) and refer to an existing IID. This GUID should be the same as the interface IID to be used.

```
// Define OBJID and IIDs that serve as (Passive) JDLines
define IID IJDLine 0x260E0A1F 0x04F18 0x11D1 0x97 0x70 0x08 0x
00 0x36 0x75 0x42 0x 03
define OBJID JDLine 0x260E0A1F 0x04F18 0x11D1 0x97 0x70 0x08
0x 00 0x36 0x75 0x42 0x 03 0x00
```

Now that the participating OBJID and IID are specified, an interface for the Repository may be created. The createINTERFACE key word is used, followed by the participating OBJID and IID:

createINTERFACE IJDLine objid JDLine iid IJDLine

Note that we could have called the OBJID, IID and INTERFACE by any names we chose. It is not the name ("IJDLine") but the actual value of the IID that marks it as an IJDLine interface.

At step 214 an OBJID and IID for the active entity is declared. In our example, the active entity is a stand-alone. That is, it exists for the sole reason of tying the passive entities of the relationship pattern together, and does not have serve as an independent business object. The name of the active object is: MakeParaAtDistanceHub and its corresponding interface: IJMakeParaAtDistanceHub. The process in step 214 is similar to step 212.

define IID IJMakeParaDistanceHub 0x42D921B7 0x7567
    0x11D1 0xBD 0x31 0x08 0x00 0x36 0xF4 0x17 0x03 define OBJID IJMakeParaDistanceHub 0x42D921B7
   0x7567 0x11D1 0xBD 0x31 0x08 0x00 0x36 0xF4
   0x17 0x03 0x00
createINTERFACE IJMakeParaDistanceHub
objid IJMakeParaDistanceHub
iid IJMakeParaDistanceHub In step 216, we define the participating relationships and roles. Our example incorporates JDLines as the passive entities in all relationships, of which there are three: "ParallelTo", "DistanceFrom" and "MPADResult". The following shows the code for specifying the "ParallelTo" relation. The full specification for all three relations can be found in Appendix 1.

First, we define an OBJID for the relationship and name it "ParallelTo". Then we create a GUID using the GuidGen tool (in Visual C++) and with the addition of a long integer, we get:

define OBJID ParallelTo 0xE6FAEAE2 0x77BA 0x11d1
   0xBD 0x33 0x08 0x00 0x36 0xF4 0x17 0x03 0x00

Having defined a OBJID for "ParallelTo", we use it in the createRELATION declaration and name the relation "ParallelToRelation". We specify the origin as IJMakeParaDistanceHub (and name the origin role "ParallelToOrigin"), the destination as IJDLine (and name the destination role "ParallelToDestination"), and the type as COLLECTION_NAMING:

createRELATION ParallelToRelation
Origin IJMakeParaDistanceHub ParallelToOrigin
Destination IJDLine ParallelToDestination
Type COLLECTION_$NAMING$ The other two relationships are declared similarly (with different GUIDs, of course).

In step 218 a semantic object is declared. Our example has only one semantic, compute. We declare a compute semantic named MakeParallelComputeSem. The process begins with defining an OBJID, in this case the identifier of our semantic instance:

define OBJID MakeParallelComputeSem 0xE6FAEAE4
   0x77BA 0x11d1 0xBD 0x33 0x08 0x00 0x36 0xF4
   0x17 0x03 0x10

Next an instance of the semantic object is created (using the createINSTANCE SemanticDef key phrase) and is connected to the relationship pattern active entity, IJMakeParaDistanceHub (using the ConnectTo key word). In the ConnectTo statement, we specify an interface (IHoldSemantic) and a collection name (Semantics). This is the collection of semantics managed by this active entity. The active entity knows nothing about this collection of its semantics; it is the act of defining them to the Repository via these statements that actually connects them. This is a major advantage of the metadata approach: entities and relationships and patterns and semantics can all be glued together outside the compiled code. The syntax is:

createINSTANCE SemanticDef MakeParallelComputeSem
ConnectTo IJMakeParaDistanceHub IHoldSemantic Semantics A semantic has two properties: Property 1 is the type of semantic: Compute, Delete or Copy; and Property 2 is the progid of the object that provides the semantics' implementation. Our type is Compute.

setPROPERTY MakeParallelComputeSem ISemantic
   noname
type char
index 1
value Compute
setPROPERTY MakeParallelComputeSem ISemantic
   noname
type char
Index 2
value AnchorSemantics.MakeParallelCompute.1

We next declare the arguments of the semantic at step 220. Our semantic has three arguments. The first two are input arguments that provide the parallel line and the distance line. The third argument is the output line. The declaration of the parallel input line is shown below. The other two are similar (see Appendix 1).

We begin declarations by creating OBJID's. Each argument has a corresponding OBJID. We name each argument according to the relation that it represents. We then connect each argument to the semantic. Note that the use of the ConnectTo keyword in this situation employs an additional argument following the collection name (Arguments): the index (1, 2, or 3) of the argument. This determines the order of arguments evaluated by the Evaluate method.

define OBJID ParallelTo_Arg 0xE6FAEAE5 0x77BA
   0x11d1 0xBD 0x33 0x08 0x00 0x36 0xF4 0x17 0x03
   0x00
insertINSTANCE ArgumentDef ParallelTo_$Arg$
ConnectTo MakeParallelComputeSem ISemantic Arguments 1

Each argument has two properties. Property I specifies whether the argument is INPUT or OUTPUT. Property 2 specifies the OBJID of the relationship)to which this argument corresponds.

setPROPERTY ParallelTo_Arg IHaveArguments noname
type char
Index 1
value INPUT
setPROPERTY ParallelTo_Arg IHaveArguments noname
type OBJID
Index 2
value ParallelToRole At step 222 MakeRepos is used to build the target Repository file and thus store the metadata in the Microsoft Repository.

Figure 6:
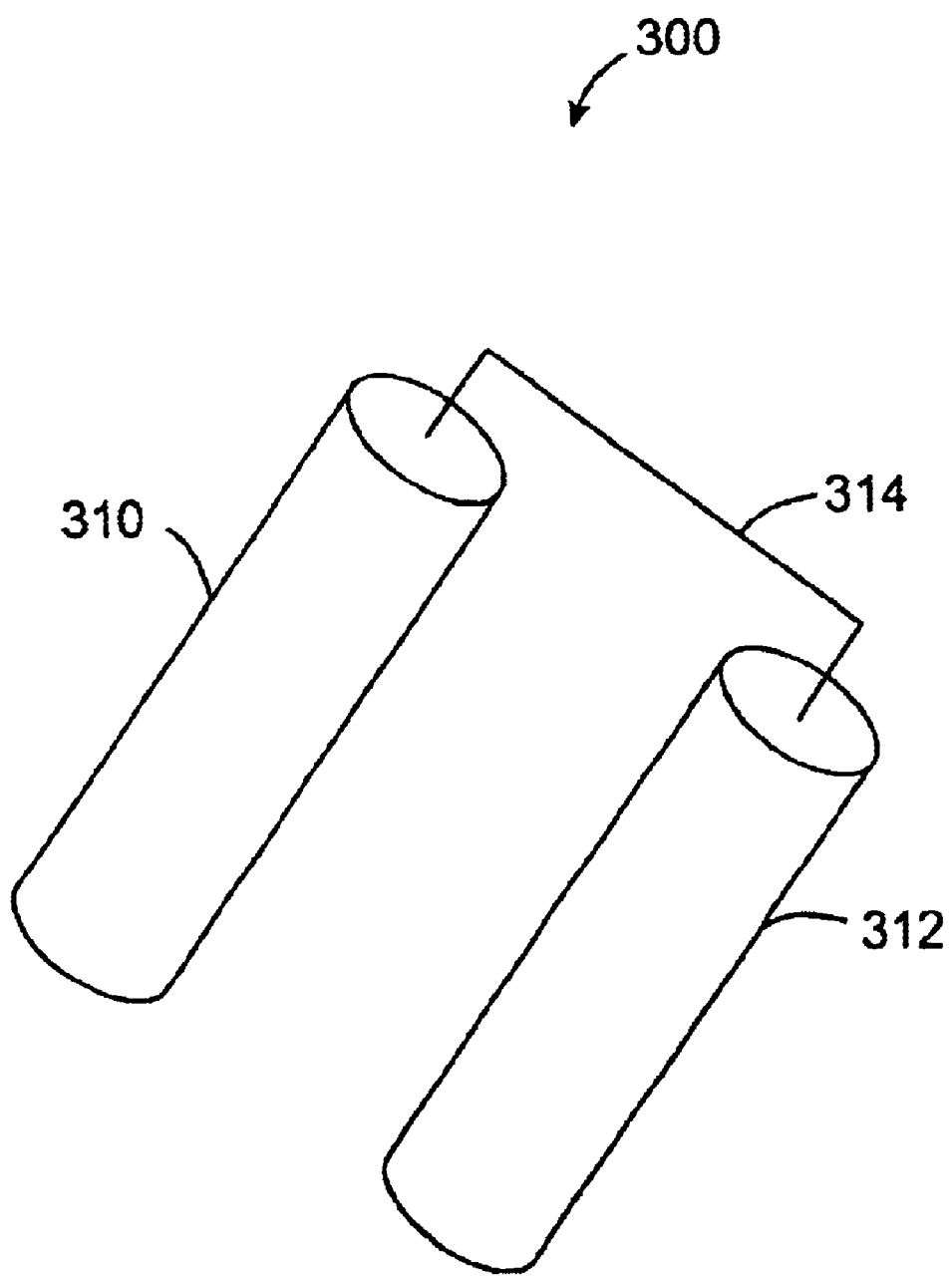
FIG. 6 shows an example of a relationship pattern that represents two parallel pipes.

FIG. 6 shows an example of a relationship pattern 300 that represents two parallel pipes(oriented relationship) 310 and 312 with the direction and distance that is given by a line 314. In short, the second pipe 312 is parallel to the first pipe 310 at a distance equal to the length of the line 314 and using the line 314 for the direction.

Figure 7:
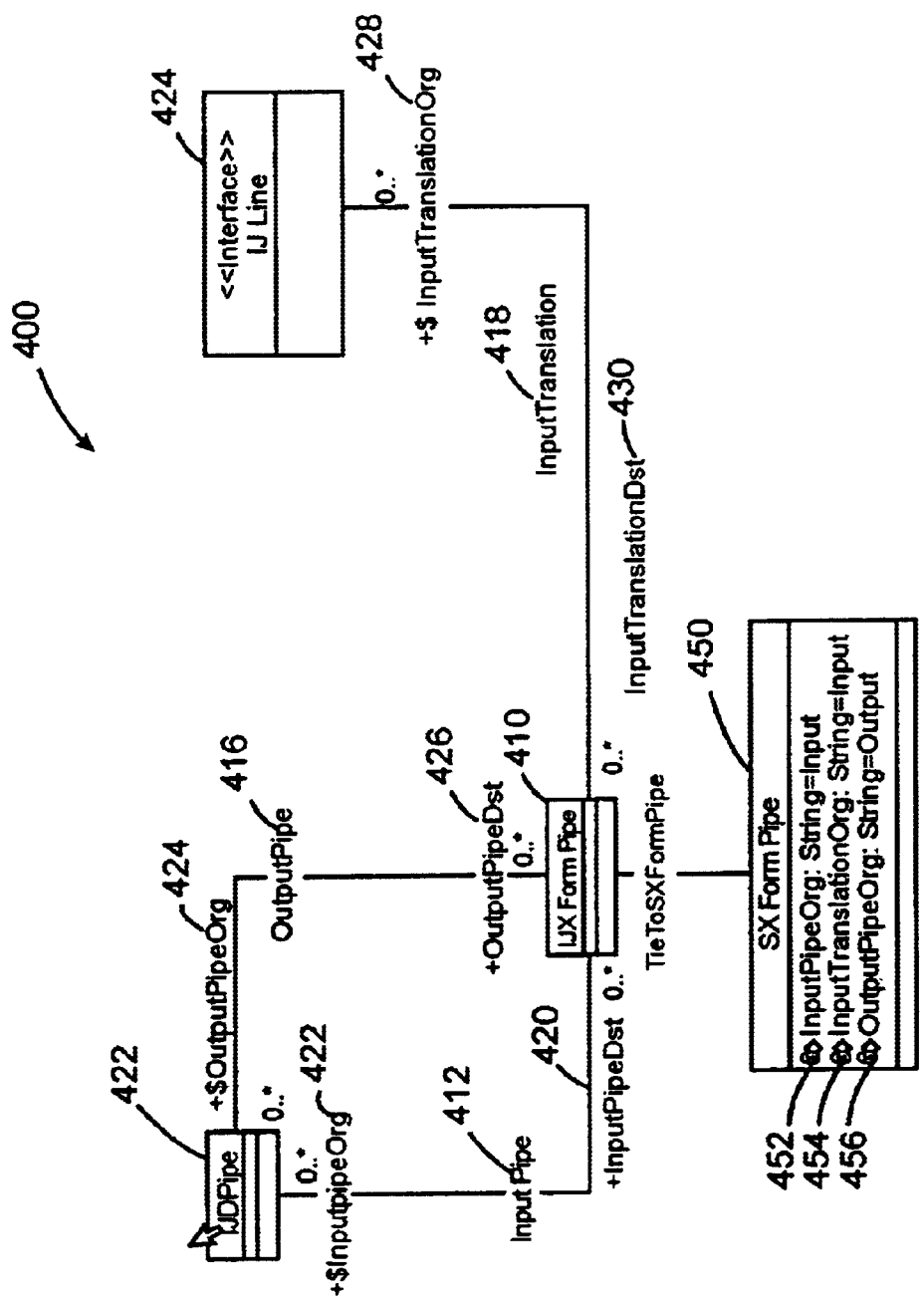
FIG. 7 shows a UML diagram describing FIG. 6 of another embodiment of the present invention.

FIG. 7 shows a UML diagram 400 describing FIG. 6 of another embodiment of the present invention. The UML shows this relationship pattern by using an interface hub, IJXFormPipe (active entity) 410 that has relations 412, 416, 418 to the passive entities, IJDPipe 422 and IJLine 424, and is tied to the compute semantic SXFormPipe 450. The descriptions of various metadata of one embodiment of the present invention that can be stored in a Repository are given in Appendix 3. The extensions to UML for one embodiment of the present invention are given in Appendix 4. Both Appendices 3 and 4 are incorporated herein.

In order to create metadata to be stored in the Repository for this embodiment using the example UML diagram of FIG. 7, the steps in FIG. 6 are followed, although not necessarily in the same order. Step 210 describes the relationship pattern in the UML diagram of FIG. 7. In step 212 the passive entities 422, 424 need to be added. A class IJDPipe is first added:

In the TypeInrepository "Value" column, change the value to Interface Change the "Value" of GUID and put in the GUID of IJDPipe:
   {E0C4E513-6EBD-11D2-BDEF-080036801C04}

There are two ways to find the GUID of an interface: (1) look at the corresponding .idl file where the interface has been defined, or (2) use the registry (regedit) and do a search for the interface name such as IJDPipe 422. Next the IJLine 424 interface is added. For this example it is assumed the IJLine interface already exists. In step 214 the active entity, IJXFormPipe 410, is added:

In the TypeInrepository "Value" column, change the value to Interface Change the value of GUID and put in the GUID of IJXFormPipe:
{4AC243C0-70F8-11D2-BDEF-080036801 C04}

In this embodiment step 218 is performed before step 216. In step 216 a semantic object is added by adding a class SXFormPipe 450:

In the Typelnrepository "Value" column, change the value to Semantic

Change the "Value" of SemanticType to Compute

Change the "Value" of SsemanticProgID to SXFormG-SCADPipe.SXFormPipe.1. (It is the ProgID of the compute semantic.)

Next an association, TieToSXFonnPipe, is created between IJXFormPipe 410 and SXFormPipe 450.

At step 216 binary relationships are added:
Create an association between IJDPipe and IJXFormPipe:
Name: InputPipe 412
Role A (IJXFormPipe side): InputPipeDst 420
Role B (IJDPipe side): InputPipeOrg 422
GSCD B Tab, change IsOrign: True
Create an association between IJDPipe and IJXFormPipe:
Name: OutputPipe 416
Role A (IJXFormPipe side): OutputPipeDst 426
Role B (IJDPipe side): OutputPipeOrg 424
GSCD B Tab, change IsOrign: True
Create an association between IJXFonnPipe and IJLine:
Name: InputTranslation 418
Role A (IJLine side): InputTranslationOrg 428
Role B (IJXFormPipe side): InputTranslationDst 430
GSCD A Tab, change IsOrign: True
At step 220 the arguments of the semantic are defined for SXFormPipe:
InputPipeOrg, SXFormPipe, String, Input 452
InputTranslationOrg, SXFormPipe, String, Input 454
OutputPipeOrg, SXFormPipe, String, Output 456

At step 222 our UML model, i.e., FIG. 7, is defined with all the necessary information (metadata) needed to define the relationship pattern for FIG. 6 and can be exported to the Repository.

In one embodiment of the present invention, after the metadata is created and deposited and the semantic objects defined, changes to a passive entity may be propagated consistently through the system by using the metadata and the semantic object(s). Use of the information in the relation objects and/or the active entities, i.e., at the business model level, is not needed, as opposed to prior art which needed to access to one and/or the other. An example will show the differences.

Figure 8:
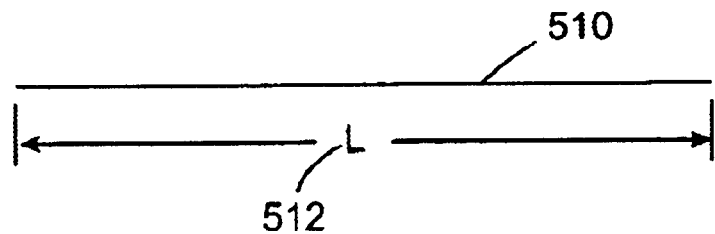
FIG. 8 illustrates two objects: a dimension and a line.

FIG. 8 illustrates two objects: a dimension 512 and a line 10 and is described in FIG. 8 of U.S. Pat. No. 5,692,184. In this example, the dimension 512 depends on the line 510 such that whenever the geometry of the line 510 changes the dimension 512 is re-calculated.

Figure 9:
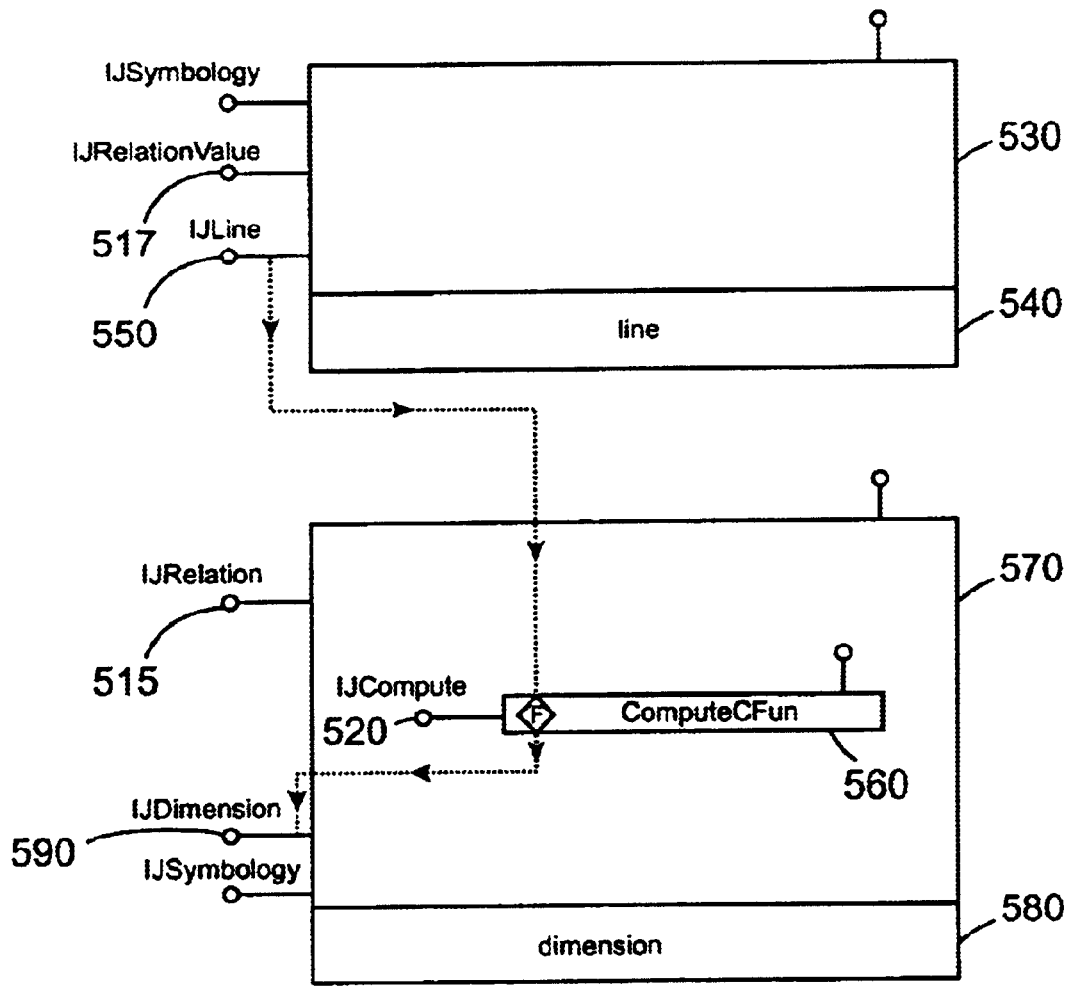
FIG. 9 illustrates a graphic representation of the COM interfaces for line and dimension of FIG. 8.

FIG. 9 illustrates a graphic representation of the COM interfaces for line 510 and dimension 512 of FIG. 8 and is described in FIG. 9 of U.S. Patent No. 5,692,184 (col. 63, line 49 to col. 64, line 37). The three nodes in the associative graph are a value node 530 representing the line's geometry (identified by line 540, and interface IJLine 550), a function node 560 representing the evaluation function, "ComputeCFun," (identified by interface IJCompute 520), and a value node 570 representing the line's dimension (identified by dimension 580, and interface IJDimension 590).

The evaluation function of function node 560 is called every time the IJLine interface 550 is changed. The evaluation function determines how the output entity, in this case IJDimension 590, is modified due to the change in input entity, IJLine 550. The evaluation function is accessed through its interface IJCompute 520, which is in turn accessed through IJRelation 515. Thus the evaluate function is accessed through a relation interface (IJRelation 515) and its interface, IJCompute 520 is part of the dimension object 570, 580.

Figure 10:
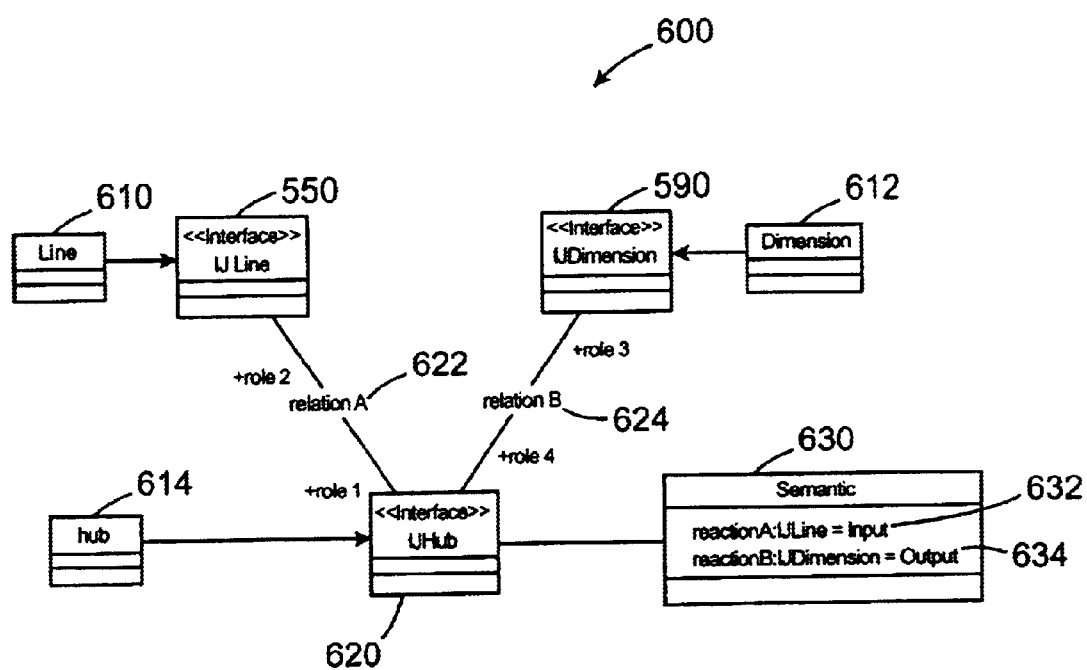
FIG. 10 illustrates a UML representation for line and dimension of FIG. 8 using a specific embodiment of the present invention.

FIG. 10 illustrates a UML representation for line 510 and dimension 512 of FIG. 8 using a specific embodiment of the present invention. Besides the IJLine Interface 550 (input passive entity) of Line object 610 and IJDimension interface 590 (output passive entity)of Dimension object 612, there is a IJHub interface 620 (active entity)for the hub object 614. IJHub 620 has no method or properties and serves solely as a hub between the two passive entities 550 and 590. There are two binary relationships, Relation_A 622 and Relation_B 624. The relationships 622 and 624 are different than those of FIG. 9, IJRelationValue 517 and IRelation 515 above, in that 622 and 624 do not point to a function. In one embodiment the evaluation function is in the semantic object 630 and is accessed through the IJCompute interface (not shown). The semantic has two arguments: Relation_A: IJLine =INPUT 632 and Relation_B: IJDimension =OUTPUT 634. Thus the semantic object 630 is separate from the entities 550, 590, and 620.

Figure 10A:
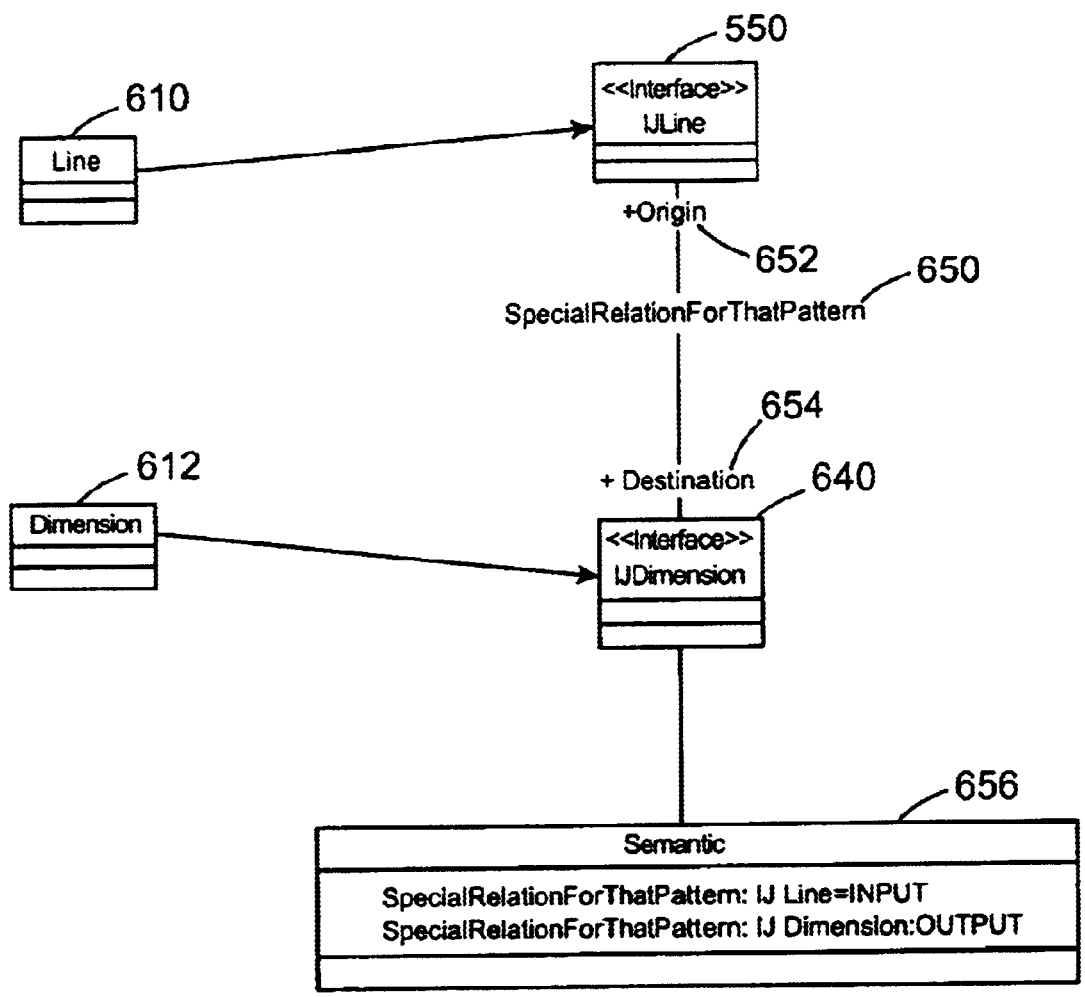
FIG. 10A illustrates another UML representation for line and dimension of FIG. 8 using another specific embodiment of the present invention.

FIG. 10A illustrates another UML representation for line 510 and dimension 512 of FIG. 8 using another specific embodiment of the present invention. In this embodiment the IJDimension interface 590 has been combined with the IJHub interface 620 into IJDimension 640. IJDimension 640 is both a passive entity, as it receives the output of the semantic object 656, as well as active entity, as it tied to the semantic object 656. Note that more than one semantic may be associated with one active entity. The relationship between IJLine 550 and IJDimension 640 is SpecialRelationForThatPattern 650 and it has an origin role 652 and a destination role 654.

Figure 11:
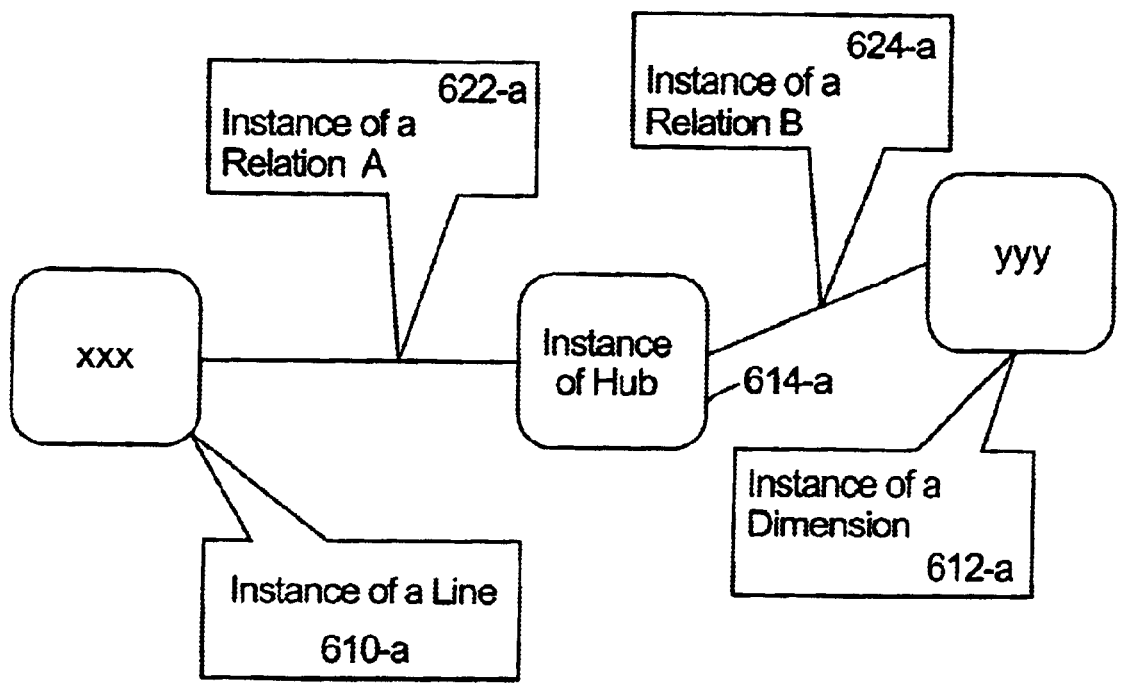
FIG. 11 shows a relationship pattern of FIG. 10 at the business model level.

FIG. 11 shows a relationship pattern of FIG. 10 at the business model level. FIG. 11 has instances of the classes given in FIG. 10 and has no semantic object 630. "xxx" 610-*a* is an instance of class Line 610. "yyy" 612-*a* is an instance of class Dimension 612. "Instance of Hub" 614-*a* is an instance of class Hub 614. There is also an instance 622-*a* of Relation_A 622-*a* and an instance 624-*a* of Relation_B 624-*a*. Thus a change on "xxx" 610-*a* may cause a change in "yyy" 612-*a*. However, how the change is accomplished is not part of the business level, but is part of the metadata and semantic object (see FIG. 10).

Figure 12:
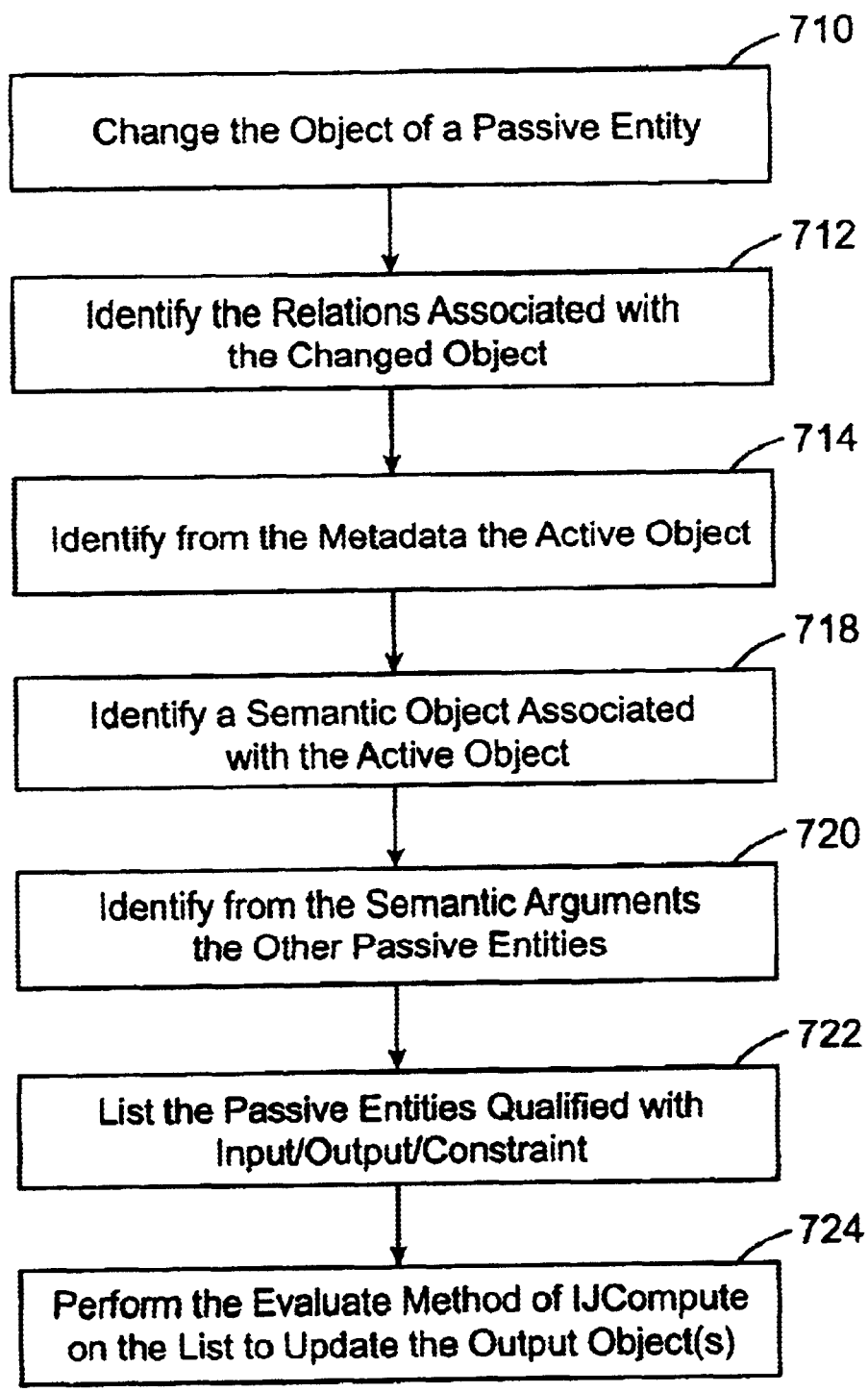
FIG. 12 gives a flowchart illustrating the updating process for one embodiment of the present invention.

FIG. 12 gives a flowchart illustrating the updating process for one embodiment of the present invention. At step 710 the value of an object is changed for example, modified (or the object may be deleted or copied). Next at step 712 the relations associated with the changed object are identified. At step 714 the metadata is examined to find the active entity that has a relation to the changed object. A semantic object(s) is then identified for the active entity (step 718). The other passive entities are identified by following the relations (given in the semantic object arguments ) from the active entity (step 720). A list is created of the passive entities, where each passive entity is qualified with a input/output/constraint identification (step 722). The IJcompute interface for the semantic is called and the Evaluate method is performed on the list of qualified entities, and the output (and some constraint) object(s) is updated with the result(s) of the Evaluate method (step 724). Note the evaluate method is in charge of updating the output object(s).

An example of the steps in FIG. 12 applied to FIGS. 10 and 11 is:

1. Modify a line (interface IJLine 550 on object xxx 610a).
2. Look at the relations enabled on object xxx 610a and find an instance of Relation_A 622-a.
3. Look in the metadata for the definition of relation_A 622 and see that relation_A 622 is attached to IJHub 620.
4. Look at all the semantics associated to IJHub 620 and find semantic object 630.
5. Look at the arguments 632, 634 of that semantic object 630 and find one that takes Relation_A:IJLine 632 as input. If a line was attached to IJHub using another relation type, e.g. Relation_Z, the semantic would not need to be triggered. From now on the semantic must be triggered to update the outputs. Look in the metadata for the other arguments required and find IJDimension 590 following Relation_B 624 from IJHub 620.
6. Navigating the instances, construct a structure containing a pointer on xxx.IJLine (qualified as INPUT) and a pointer on yyy.IJDimension (qualified as OUTPUT).
7. Look at the CLSID(Class Identifier) associated with the semantic in the metadata. The CLSID is an identifier used to get the filename of the DLL (Dynamic Link Library) file containing the semantic object 630.
8. Cocreate the object having CLSID found in step 7 and query its IJCompute interface. "CoCreateInstance" creates an instance of the semantic object 630.
9. Call the evaluate method on the IJCompute interface of step 8 with the arguments of the structure constructed in step 6. The evaluate method updates the Dimension (interface IJDimension 590 on object yyy 612-a).

By using the metadata types and the associative graph and applying the steps in FIG. 12, consistency can be maintained for any number of persistent objects or any objects in a object-oriented or relational database (persistent objects is further described in "The Essential Distributed Objects, Survival Guide," Robert Orfali, Dan Harkey, and Jeri Edwards, 1996, John Wiley and Sons, which is herein incorporated by reference. Thus a change in one entity could be propagated though out the persistent objects or database. This is accomplished by using the metadata to construct the associative graph starting from the changed entity and then traversing the graph to update the connected entities.

Figure 13:
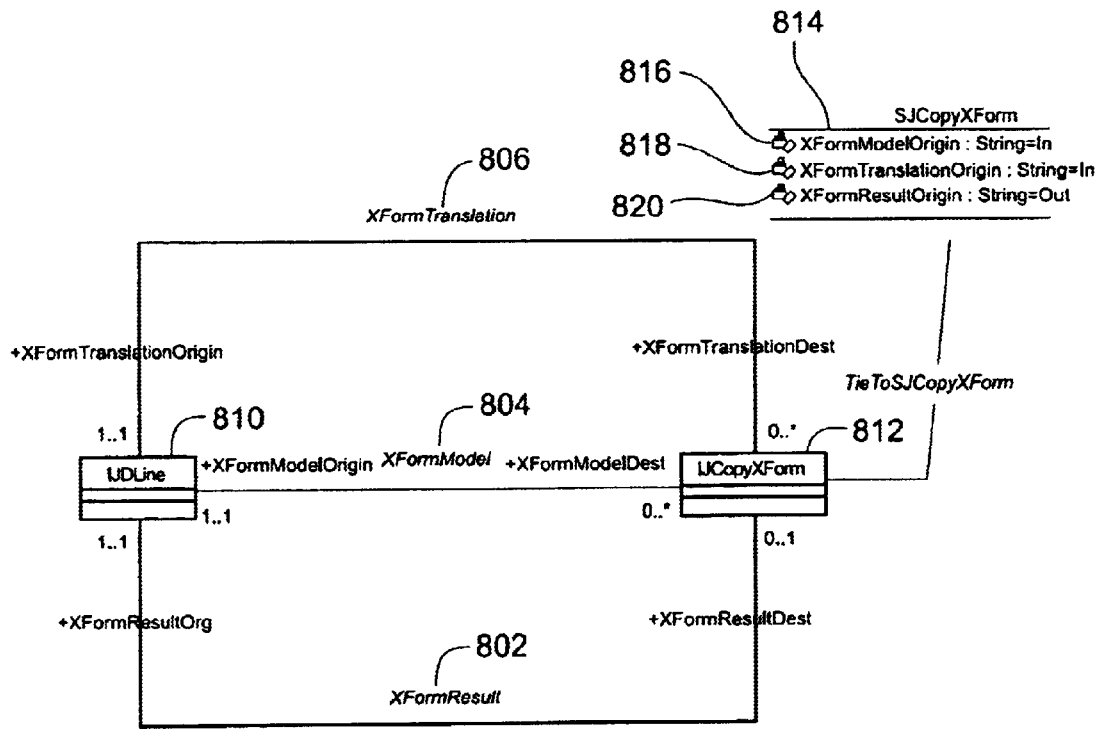
FIG. 13 illustrates a UML diagram for parallel lines.

FIG. 13 illustrates a UML diagram for parallel. lines. The output line (with XFormResult relation 802) is parallel to the Model line (with XFormModel relation 804) and is at distance and direction given by a translation line (with XFormTranslation relation 806). IJDLine 810 is a passive entity. IJCopyXForm 812 is an active entity. SCopyXForm 814 is the semantic object tied to the active entity 812.

Figure 14:
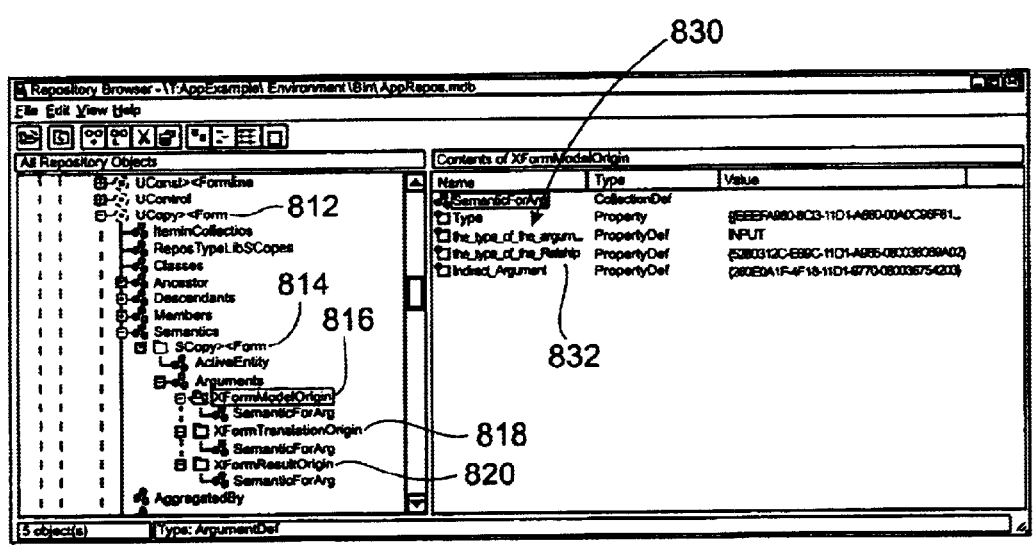
FIG. 14 depicts relationship pattern information for FIG. 13 as seen using a repository browser of one embodiment of the present invention.

FIG. 14 depicts relationship pattern information for FIG. 13 as seen using a repository browser of one embodiment of the present invention. The active entity ICopyXForm 812 is displayed in a tree format. IJDLine 810 is also displayed (not shown on FIG. 14) on the same level as ICopyXForm 812. Semantic SCopyXForm 814 has a collection of arguments associated with it including arguments XFormModelOrigin 816, XFormTranslationOrigin 818, and XFormResultOrigin 820. The arguments are qualified as input, output, or constraint arguments as indicated by the "the_type_of_argum..." property 830. Accordingly, FIG. 13 depicts that the XFormModelOrigin entity is an input argument 816. The "type_of_the_Relship" property 832 indicates which relationship to follow to find the argument starting from the active entity. It should be noted that the active entity itself may be qualified as an input, output, or constraint argument to the semantic associated with the relationship pattern definition.

In the foregoing specification, the invention has been described with reference to specific exemplary embodiments thereof. Other embodiments will be apparent to those of ordinary skill in the art. For example, embodiments of the present invention could be realized using CORBA (Common Object Request Broker Architecture) rather than COM. A comparison is given in the text "COM and COBRA Side by Side," by Jason Pritchard, Ph.D, 1999, Addison-Wesley and is herein incorporated by reference in its entirety for all purposes. Thus, it is evident that various modifications and changes may be made thereunto without departing from the broader spirit and scope of the invention as set forth in the appended claims and their full scope of equivalents.

What is claimed is:

1. A method for maintaining consistency between objects in a computer system, the method comprising:
    providing a first relationship between a first entity and a second entity;
    providing a semantic object comprising an action to be performed in response to a change in the first entity;
    associating the semantic object with the second entity; and
    making a change in the first entity thereby invoking the action.

2. The method of claim 1 wherein the second entity has an active entity.

3. The method of claim 2 wherein the active entity has an associated stub object.

4. The method of claim 2 wherein the first entity has a passive entity.

5. The method of claim 1 wherein the objects are persistent objects.

6. The method of claim 1 further comprising:
    determining a relationship pattern comprising the first entity, the second entity, and the semantic object;
    determining one or more arguments of the semantic object;
    invoking a change in the first entity;
    using information from the relationship pattern and one or more arguments of the semantic object, determining the location of an output; and
    evaluating the action to produce the output.

7. The method of claim 1 wherein the semantic object is accessed from a DLL file.

8. The method of claim 1 further comprising:
    providing a second relationship between a third entity and the second entity; and
    after the action is invoked, performing the action on the third entity.

9. The method of claim 1 wherein the action is selected from a group consisting of copy, delete, and modify.

10. A method of maintaining the integrity of objects in a database, the method comprising:

determining a relationship pattern, comprising a binary relation between a first entity and a second entity;

providing a semantic object comprising an action to be performed in response to a change in the first entity;

associating the semantic object with the second entity;

determining metadata comprising information from the relationship pattern and arguments of the semantic object; and storing the metadata and the semantic object.

11. The method of 10 wherein the metadata is stored in a COM or CORBA repository.

12. The method of 10 wherein the semantic object is stored in a DLL file.

13. A method for updating information in a database, comprising a first relation between a first entity and a second entity and a second relation between a second entity and a third entity, the method comprising:

changing a first object of the first entity;

identifying the first relation as being associated with the first object;

using the first relation and repository metadata, identifying the second entity as an active entity;

identifying a semantic object associated with the active entity, wherein the semantic object comprises an action to be performed in response to a change in the first entity;

using arguments of the semantic object, identifying the third entity; and evaluating the action to change the third entity.

14. A computer system for maintaining consistency between objects, comprising:

a processor; and a memory coupled to the processor, the memory storing a relationship pattern information and modules for execution by the processor;

wherein the relationship pattern information includes:
information defining a first relationship between a first entity and a second entity;
information defining a second relationship between a third entity and the second entity; and
information defining a semantic object with an action to be performed for changing the third entity in response to changes in the first entity; and wherein the modules include:
a module for associating the semantic object with the second entity; and
a module for invoking the action when the first entity is changed.

15. A computer program product for a computer system including a processor and a memory for maintaining consistency between objects, the computer program product comprising:

code for directing the processor to provide a first relationship between a first entity and a second entity;

code for directing the processor to provide a semantic object with at least one action to be performed;

code for directing the processor to associate the semantic object with the second entity;

code for directing the processor to invoke at least one action when the first entity is changed; and a computer-readable medium for storing the codes.

16. A method for providing consistency among persistent objects in a computer system, comprising:

using the metadata in a repository, constructing a graph, comprising entities and relations;

associating with each active entity a semantic object;

changing one passive entity, comprising a persistent object, in the graph; and traversing the graph to update the entities using the semantic objects.

17. A method in a computer system for displaying relationship pattern information in a browser comprising:

displaying a entity as a node on a hierarchical browser folder tree;

If the node is an active entity, displaying the associated semantic object; and for each argument of the semantic object, displaying a related role.

* * * * *